United States Patent
Mujumdar et al.

(10) Patent No.: US 12,333,012 B2
(45) Date of Patent: Jun. 17, 2025

(54) APPARATUSES, METHODS, AND COMPUTER PROGRAMS FOR DETECTING AN IMPOSTOR SYSTEM

(71) Applicant: Telefonaktiebolaget LM Ericsson (publ), Stockholm (SE)

(72) Inventors: Anusha Pradeep Mujumdar, Bangalore (IN); Vijaya Yajinanarayana, Bangalore (IN); Senthamiz Selvi Arumugam, Solna (SE); Ramamurthy Badrinath, Karnataka (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 280 days.

(21) Appl. No.: 17/776,700

(22) PCT Filed: Nov. 15, 2019

(86) PCT No.: PCT/IN2019/050843
§ 371 (c)(1),
(2) Date: May 13, 2022

(87) PCT Pub. No.: WO2021/095044
PCT Pub. Date: May 20, 2021

(65) Prior Publication Data
US 2022/0398318 A1  Dec. 15, 2022

(51) Int. Cl.
*G06F 21/00* (2013.01)
*G06F 18/22* (2023.01)
(Continued)

(52) U.S. Cl.
CPC .............. *G06F 21/57* (2013.01); *G06F 18/22* (2023.01); *H04L 63/1408* (2013.01); *H04L 63/1433* (2013.01)

(58) Field of Classification Search
CPC ........ G06F 21/57; G06F 18/22; G06F 21/552; H04L 63/1408; H04L 63/1433
See application file for complete search history.

(56) References Cited

U.S. PATENT DOCUMENTS 9,762,588 B2   9/2017  Hudack et al.
9,781,151 B1 * 10/2017  McCorkendale ..... G06F 21/562
(Continued)

FOREIGN PATENT DOCUMENTS

WO  WO-2016153740 A1 *  9/2016  ........... G06F 21/552

OTHER PUBLICATIONS

International Search Report and Written Opinion issued in International Application No. PCT/IN2019/050843, dated Mar. 5, 2020 (21 pages).

(Continued)

*Primary Examiner* — Ka Shan Choy
(74) *Attorney, Agent, or Firm* — Rothwell, Figg, Ernst & Manbeck, P.C.

(57) ABSTRACT

In one aspect there is a method for detecting whether a first system should be declared as an impostor. In one embodiment, the method includes generating baseline system output information using first system input; exposing the first system to the first system input; obtaining first system output information generated by the first system based on the first system's exposure to the first system input; determining a first similarity measure that indicates a similarity between the baseline system output information and the first system output information generated by the first system; and using the first similarity measure, determining whether or not to declare the first system as an impostor.

13 Claims, 9 Drawing Sheets

(51) Int. Cl.
*G06F 21/57* (2013.01)
*H04L 9/40* (2022.01)

(56) References Cited

U.S. PATENT DOCUMENTS

| | | | | |
|---|---|---|---|---|
| 10,846,434 | B1* | 11/2020 | Ben-Zvi | G06Q 50/01 |
| 2008/0271019 | A1* | 10/2008 | Stratton | G06F 21/577 |
| | | | | 718/1 |
| 2009/0089869 | A1* | 4/2009 | Varghese | G07F 7/1008 |
| | | | | 726/7 |
| 2009/0192810 | A1* | 7/2009 | Filatov | G06Q 30/0185 |
| | | | | 705/318 |
| 2011/0093773 | A1* | 4/2011 | Yee | G06F 16/986 |
| | | | | 715/234 |
| 2016/0036672 | A1* | 2/2016 | Singh | H04L 43/0823 |
| | | | | 370/252 |
| 2024/0111860 | A1* | 4/2024 | Strogov | G06F 21/554 |

OTHER PUBLICATIONS

Karen Hao, "Google's AI can now translate your speech while keeping your voice", MIT Technology Review, Artificial Intelligence, May 20, 2019 (7 pages).
Ye Jia et al, "Direct-speech-to-speech translation with a sequence-to-sequence model", Google, arXiv:1904.06037v2 [cs.CL], Jun. 25, 2019 (5 pages).
Kyle Wiggers, "Facebok's AI can convert one singer's voice into another", VentureBeat, Apr. 16, 2019 (6 pages).

* cited by examiner

APPARATUSES, METHODS, AND COMPUTER PROGRAMS FOR DETECTING AN IMPOSTOR SYSTEM

CROSS REFERENCE TO RELATED APPLICATION(S)

This application is a 35 U.S.C. § 371 National Stage of International Patent Application No. PCT/IN2019/050843, filed Nov. 15, 2019.

TECHNICAL FIELD

Disclosed are embodiments related to detecting an impostor system.

BACKGROUND

It is increasingly feasible using machine learning to create a system that mimics the behavior of another system (or even a human). See, e.g., references [1] and [2]. Such impostor systems (a.k.a., "impostor agents") can be used by malicious entities to orchestrate large scale attacks in networked systems. Such attacks can take various forms, e.g. Deepfakes and Masquerade attacks.

Detecting an impostor system is vital in mission-critical applications, such as financial systems, factory automation, etc. It is particularly important to detect impostors when large scale distributed learning approaches such as federated learning are used.

SUMMARY

Certain challenges presently exist. For example, existing solutions for detecting impostor systems typically detect the impostors after an attack has already begun. What is needed, therefore, is a more pro-active approach to impostor detection that can increase the probability of detecting an impostor system before the impostor system is used maliciously. This disclosure provides such a pro-active approach.

The present disclosure provides systems and methods to detect Artificial Intelligence (AI) based impostor agents before large scale attacks can be carried out. An exemplary system crafts an input to a questionable system, whose output is measured to ascertain whether the questionable system is an impostor. An impostor system has incomplete information about a trusted system, due to limited observations of the trusted system. This is leveraged in crafting the input for the questionable system. For example, the exemplary system uses the fact that extreme values are not properly learned by an impostor system, which relies on machine-learning agents.

Impostors can be detected if their behavior, f'(X), can be properly distinguished from the original system, f(X), i.e., by examining whether some distance measure $d(f'(X), f(X))$ is greater than a threshold.

Accordingly, in one aspect there is provided a method for detecting whether a first system should be declared as an impostor. The method includes obtaining baseline system output information that was generated based on first system input. The method then includes obtaining first system output information that was generated by the first system and is based on the first system's exposure to the first system input. The method then includes determining a first similarity measure, which indicates a similarity between the baseline system output information and the first system output information generated by the first system. The method then includes determining whether or not to declare the first system as an impostor, by using the first similarity measure.

In one embodiment, obtaining the baseline system output information comprises (1) exposing a second system to the first system input, wherein the second system is a trusted system; and (2) obtaining second system output information generated by the second system based on the second system's exposure to the first system input. For example, the second system output information comprises the baseline system output information.

In one embodiment, obtaining the baseline system output information comprises (1) exposing the first system to the first system input at a time when the first system was trusted; and (2) obtaining second system output information generated by the first system based on the trusted system's exposure to the first system input at a time when the first system was trusted. Thereby, the second system output information comprises the baseline system output information.

In one embodiment, obtaining the first system output information comprises exposing the first system to the first system input and then collecting data from the first system.

In one embodiment, the first system is a first environmental sensor for sensing at least a first environmental condition (e.g., temperature). For example, exposing the first system to the first system input comprises placing the first system in an area in which the first environmental condition (e.g., temperature) is within a predefined range.

In one embodiment, obtaining the baseline system output information comprises: (1) placing a second environmental sensor system in an area in which the first environmental condition (e.g., temperature) is within the predefined range; and (2) collecting data from the second environmental sensor while the second environmental sensor is located in the area.

In one embodiment, the first system is a network traffic monitoring function for monitoring network traffic. For example, exposing the first system to the first system input comprises generating simulated network traffic and exposing the network traffic monitoring function to the simulated network traffic.

In one embodiment, obtaining the baseline system output information comprises: (1) exposing a trusted network traffic monitoring function to the simulated network traffic; and (2) collecting data output by the trusted network traffic monitoring function as a result of the trusted network traffic monitoring function being exposed to the simulated network traffic.

In one embodiment, the first similarity measure is equal to norm(SO1,SO2), wherein norm(SO1,SO2) is a function that produces a value indicating a similarity between SO1 and SO2. SO1 is the system output information generated by the trusted system, and SO2 is the system output information generated by the first system.

In one embodiment, norm( ) is a function that produces a root mean square error based on SO1 and SO2. In another embodiment, norm( ) is a function that produces a mean-absolute-error (MAE).

In one embodiment, the baseline system output information comprises a first output value vector, which comprises a first output value corresponding to a first input value. The first system output information generated by the first system comprises a second output value vector, which comprises a second output value corresponding to the first input value. Determining a first similarity measure comprises determining a mathematical difference between the first output value and the second output value. In one embodiment, the difference is expressed in terms of the generalized norm distance between the first output value and the second output value.

In one embodiment, the baseline system output information comprises a first set of output values. The first system output information generated by the first system comprises a second set of output values, wherein each output value included in the second set of output values corresponds to an output value included in the first set of output values. Determining the first similarity measure comprises, for each output value included in the second set of output values: (1) determining a mathematical difference between the output value included in the second set of output values and its corresponding output value in the first set of output values and (2) squaring the mathematical difference.

In one embodiment, the first system input is selected from a plurality of input features. Each feature of the plurality of input features includes a corresponding probability value. Features of the plurality of input features having a corresponding probability value below a threshold probability value are selected as the first system input.

The present disclosure further provides for a computer program comprising instructions which when executed by processing circuitry causes the processing circuitry to perform the method of any one of the above embodiments.

The present disclosure further provides a carrier containing the computer program described above, wherein the carrier is one of an electronic signal, an optical signal, a radio signal, and a computer readable storage medium.

Therefore, the systems and methods of the present disclosure provide proactive discovery of impostors; by contrast, in conventional systems, attack vectors are identified when they occur organically—e.g. anomaly detection, risk analysis etc. Consequently, the present disclosure provides increased trust, safety, sovereignty in an exemplary system, because the trustworthiness of the system can be verified. For example, a network is empowered to detect impostor AI agents that may be mimicking the behavior of human/other AI agents. Furthermore, the disclosed method is simple to implement, especially when knowledge of the original agent is known/saved. Altogether, the method is general across various environments where such agents may be employed—e.g. IoT, smart factories, federated learning in base stations, and other similar implementations.

BRIEF DESCRIPTION OF THE DRAWINGS

The accompanying drawings, which are incorporated herein and form part of the specification, illustrate various embodiments.

DETAILED DESCRIPTION

Figure 1:
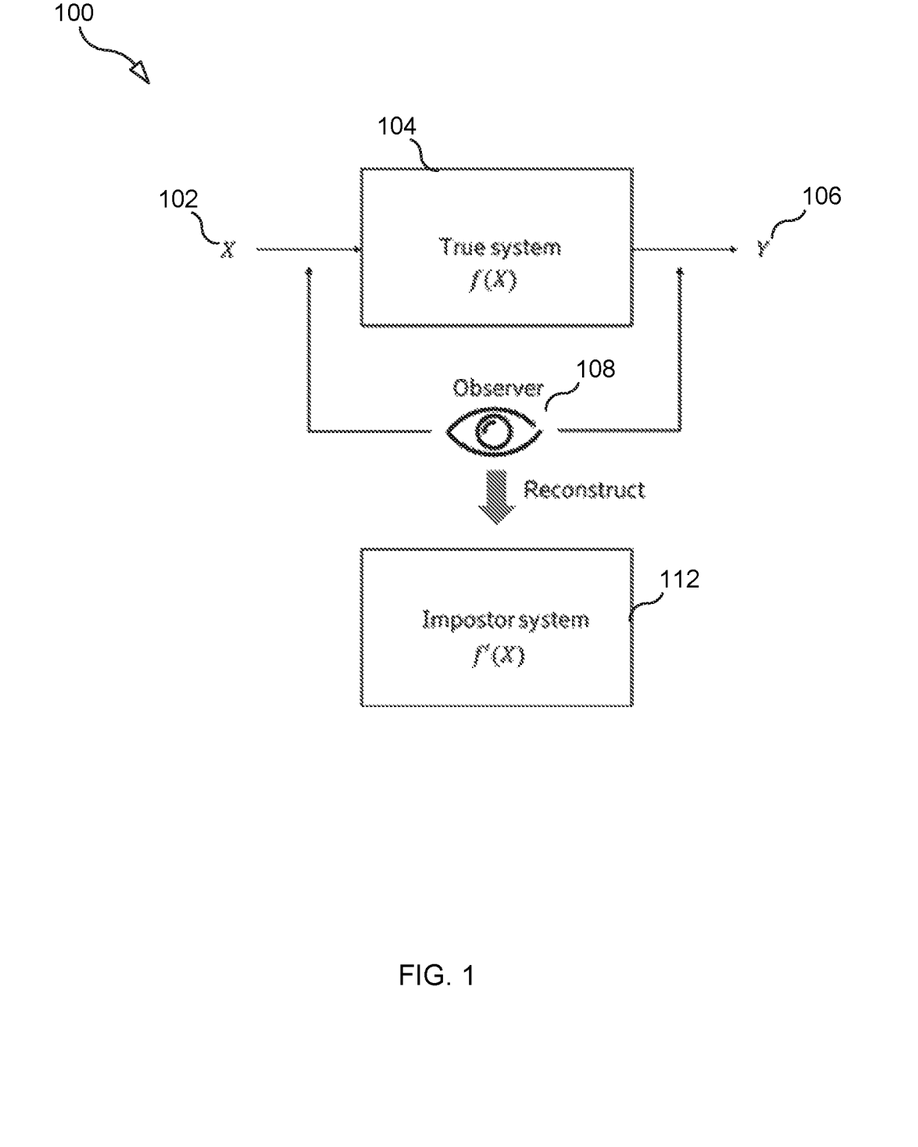
FIG. 1 illustrates an observer creating an impostor system.

FIG. 1 illustrates an observer entity 108 creating an impostor system 112 based on observing a true system 104 in operation. That is, the true system 104 is the system that the observer entity 108 intends to reproduce. In some examples, the observer entity 108 collects a plurality of system input 102, and tracks which system output 106 corresponds to each input 102. The first system 104 has some function f(X) which converts the system input 102 into the system output 106. Although the observer entity 108 does not have access to the function f(X), the observer entity creates a second system 112 (e.g., an impostor system), which produces a second function f'(X). f'(X) intends to provide similar outputs to f(X) when receiving similar input. In some examples, f'(X) is a machine-learning model created based on a plurality of inputs and corresponding outputs from the first system 104. The present disclosure provides for detecting that the second system 112 is an impostor system by examining a distance measure between f(X) and f'(X); when the distance measure is greater than a set threshold, the present disclosure provides for identifying that f'(X) is associated with an impostor system.

Figure 2:
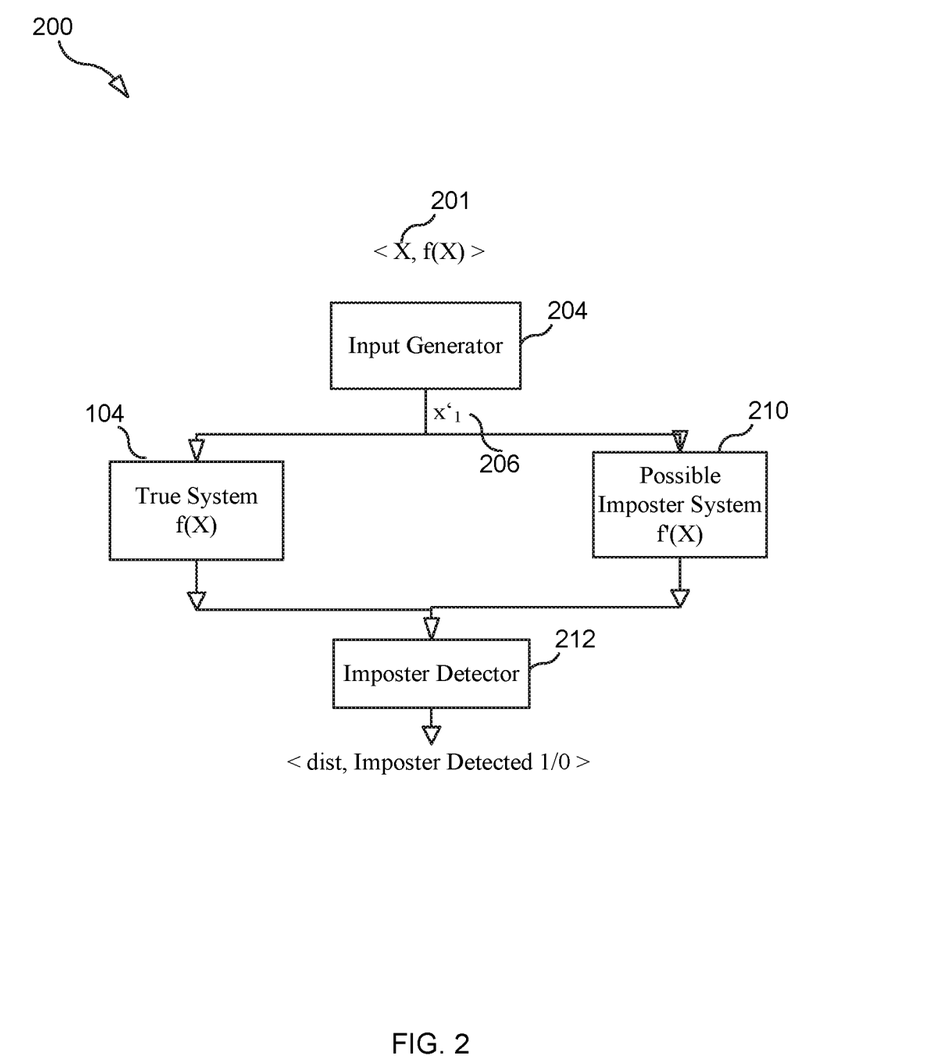
FIG. 2 illustrates a block diagram of an exemplary system detecting an impostor, according to an embodiment.

FIG. 2 illustrates a block diagram of an exemplary system 200 for detecting an impostor, according to an embodiment. System 200 includes an input generator 204 that generates or obtains system input 206 to which the true system 104 and the possible impostor system 210 will be exposed. System 200 also includes an impostor detector 212.

The input generator 204 receives a set of inputs 201 (denoted X). The input generator 204 selects a subset of X (denoted $x'_1$), which subset will be the system input 206 to which true system 104 and a possible impostor system 210 will be exposed. The true system 104 is a system that is known to be uncompromised, and the possible impostor system 210 may or may not be compromised.

In some examples, the input generator 204 selects one or more values $x'_1$ 206 which correspond to 'extreme' input values—i.e., input values that are rare or infrequently used. Observer entities typically observe the true system 104 for only a limited period of time; therefore, observers predominantly encounter common or frequently-used input and do not encounter rare or infrequently-used input. In some examples, the input generator 204 selects rare or infrequently-used input for the system input $x'_1$ 206 because this input has a low-probability of being learned by a machine-learning agent.

Consider a single feature (i.e., a universe of possible system input) X1:

$$X_1 = \begin{bmatrix} X'_1 \\ X''_1 \\ X'''_1 \end{bmatrix}$$

The true system 104 can have been operating in the X1" space since its deployment. Therefore X1 can be partitioned as above, with X1' and X1''' representing extreme values. The performance of the possible impostor system 210 can be checked by giving the possible impostor system 210 inputs of X1' and X1'''. In some examples, each feature X1 is an array of values.

FIG. 2 further illustrates that the input generator 204 exposes true system 104 and system 210 (the possible impostor) to $x'_1$ 206. As a result of being exposed to the system input 206, the true system 104 produces an output (i.e., f(x)) and system 210 produces an output (f'(x)). This can be performed simultaneously or at different instances in time.

The impostor detector 212 receives output from both the true system 104 and the possible impostor system 210. The output from true system 104 is referred to as baseline system output information. The impostor detector 212, using the baseline system output information and the system output information generated by possible impostor system 210, generates a similarity measure that indicates the similarity between the baseline and the output of system 210. Based on this similarity measure, impostor detector may output a binary notification of whether the possible impostor system 210 is or is not an impostor (e.g., a TRUE/FALSE identifier). For example, if the similarity measure is below a threshold, then the system 210 is declared an impostor.

In some examples, multiple input sets are passed to both the true system 104 and the possible impostor system 210, including, for example, X1' and X1'". In this example, two similarity measures are used; a first measure dist1=norm(f(X'),f'(X')) compares the output for X1' and a second measure dist2=norm(f(X''')–f(X''')) compares the output for X1'". If the similarity measures provide a value below a threshold value, the impostor detector 212 indicates that the possible impostor system 210 is an impostor agent. In some examples, the impostor detector 212 further identifies that the impostor system 210 needs to be examined further and/or removed from operation.

Figure 3A:
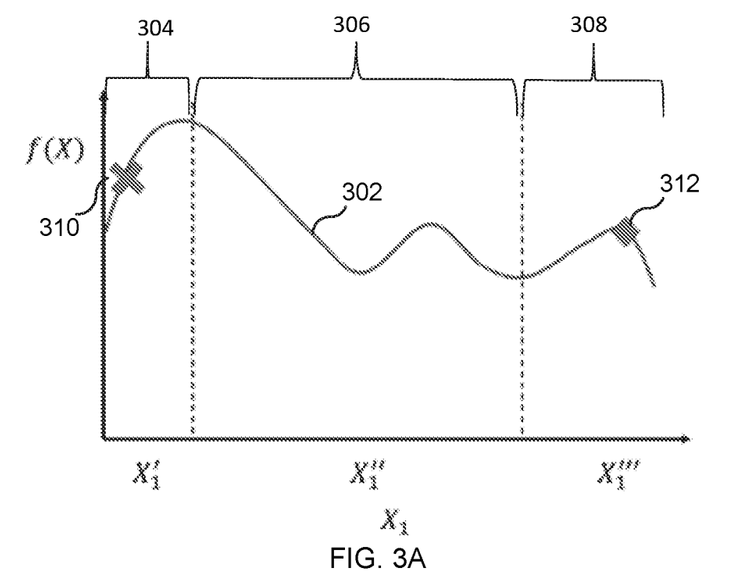
FIG. 3A illustrates exemplary performance data of a trusted system, according to an embodiment.
Figure 3B:
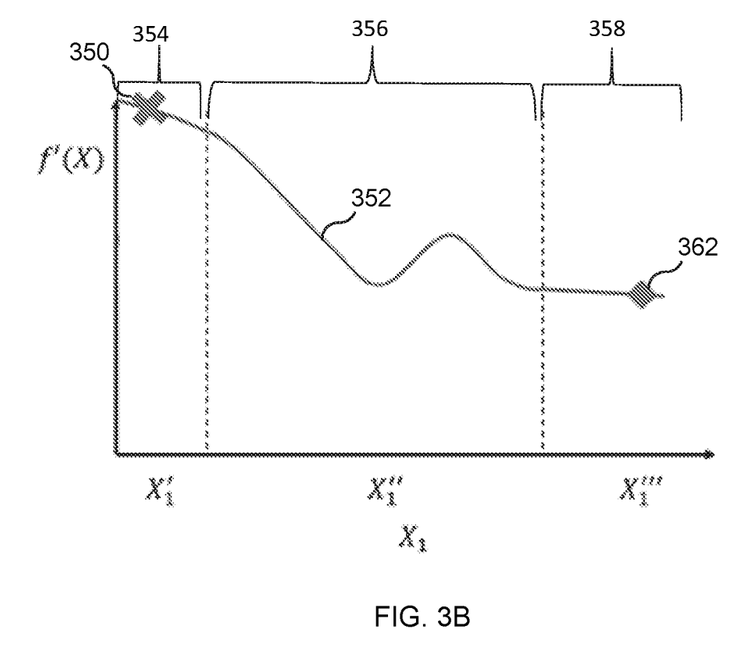
FIG. 3B illustrates exemplary performance of an impostor system, according to one embodiment.

FIG. 3A illustrates exemplary performance data of a trusted system, according to an embodiment. FIG. 3B illustrates exemplary performance of an impostor system, according to one embodiment. Referring first to FIG. 3A, the trusted system provides output 302 when provided with input $X_1$, and referring to FIG. 3B, the impostor system provides output 352 when provided with input $X_1$. Comparing FIG. 3A to FIG. 3B shows the differences in output between the two systems for the same input. For example, a given point 310 in a range of X1' output 304 for a trusted system (FIG. 3A) is different than a given point 350 in a range of X1' output 354 for an impostor system (FIG. 3B). Similarly, a given point 312 in a range of X1'" output 308 for a trusted system (FIG. 3A) is different than a given point 362 in a range of X1'" output 358 for an impostor system (FIG. 3B). Notably, the range of X1" output 356 in the impostor system (FIG. 3B) is similar (or identical to) the range of X1" output 306 in the trusted system (FIG. 3A). FIGS. 3A-3B demonstrate that presenting X1' and X1'" input provide better predictors of whether a system is an impostor.

Figure 4A:
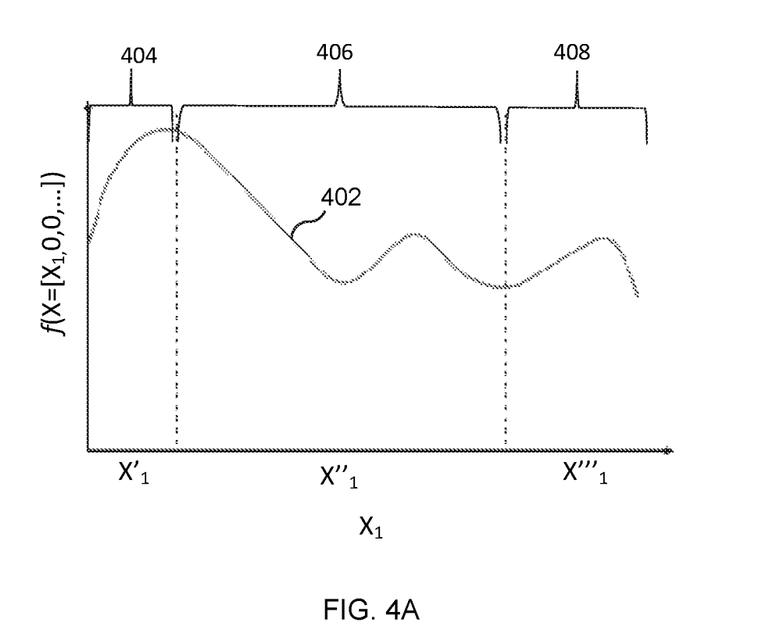
FIG. 4A illustrates exemplary output of a first feature, according to an embodiment.
Figure 4B:
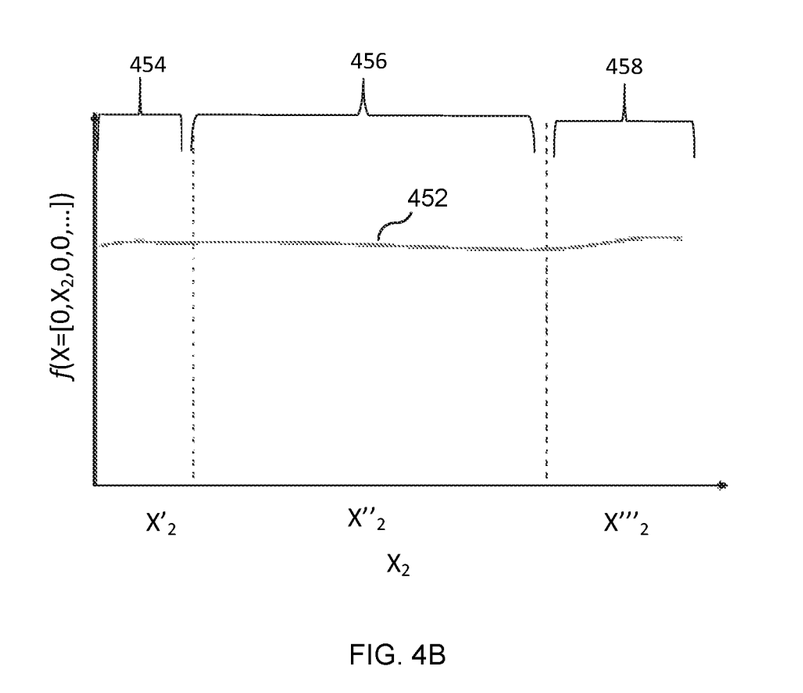
FIG. 4B illustrates exemplary output of a second feature, according to one embodiment.

FIGS. 4A-4B compare a sensitivity analysis-based feature importance check between a first feature, X1 (FIG. 4A), and a second feature, X2 (FIG. 4B). In typical machine-learning models, some features are more important than others. FIG. 4A shows that X1 output 402 has greater variability among output ranges X1' 404, X1" 406, and X1'" 408 as compared to the X2 output 452 has greater variability among output ranges X1' 454, X1" 456, and X1'" 458 of FIG. 4B. The present disclosure further contemplates that a sensitivity analysis-based feature importance check can be performed by an exemplary input generator (e.g., input generator 204 of FIG. 2) to identify the top k features to be input into a possible impostor system. FIGS. 4A-4B further illustrate how the extreme values (e.g., regions X1' 404, X1'"408, X2' 454, and X2'" 458) can have more importance. The present disclosure contemplates that tests to identify the top k features are performed at periodic time steps to provide proactive detection.

Figure 5:
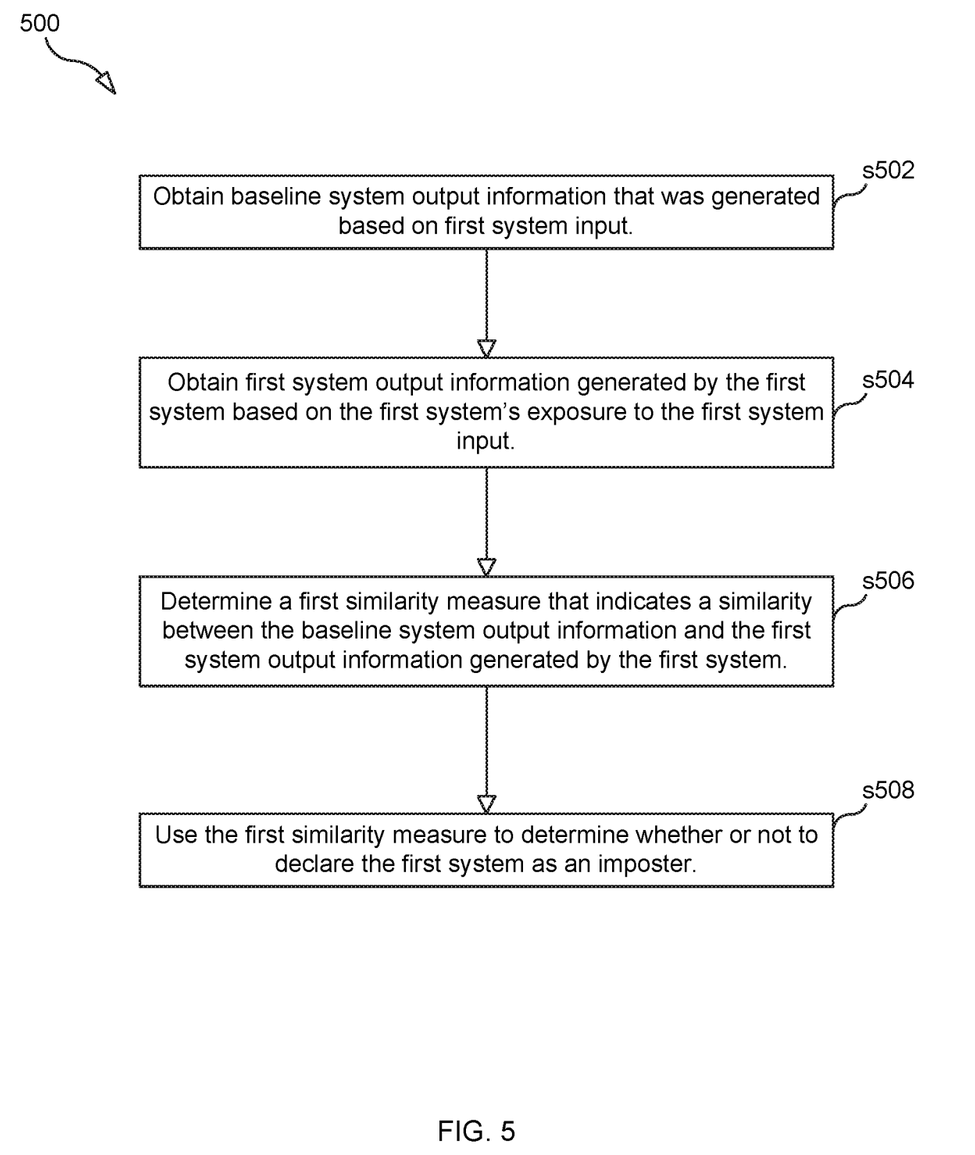
FIG. 5 is a flowchart illustrating a process, according to an embodiment.

FIG. 5 is a flowchart illustrating a process 500, according to an embodiment, for detecting whether a first system (e.g., system 210) should be declared as an impostor. Step 502 comprises obtaining baseline system output information that was generated based on first system input (e.g, $X_1'$). Step 504 comprises obtaining first system output information that was generated by the first system and is based on the first system's exposure to the first system input. Step 506 comprises determining a first similarity measure, which indicates a similarity between the baseline system output information and the first system output information generated by the first system. Step 508 comprises determining whether or not to declare the first system as an impostor, by using the first similarity measure.

In one embodiment, step 502 comprises (1) exposing a second system to the first system input, wherein the second system is a trusted system; and (2) obtaining second system output information generated by the second system based on the second system's exposure to the first system input. For example, the second system output information comprises the baseline system output information.

In one embodiment, step 502 comprises (1) exposing the first system to the first system input at a time when the first system was trusted; and (2) obtaining second system output information generated by the first system based on the trusted system's exposure to the first system input at a time when the first system was trusted. Thereby, the second system output information comprises the baseline system output information.

In one embodiment, step 504 comprises exposing the first system to the first system input and then collecting data from the first system.

In one embodiment, the first system is a first environmental sensor for sensing at least a first environmental condition (e.g., temperature). For example, exposing the first system to the first system input (i.e., in step 504 of process 500) comprises placing the first system in an area in which the first environmental condition (e.g., temperature) is within a predefined range.

In one embodiment, step 502 comprises: (1) placing a second environmental sensor system in an area in which the first environmental condition (e.g., temperature) is within the predefined range; and (2) collecting data from the second environmental sensor while the second environmental sensor is located in the area.

In one embodiment, the first system is a network traffic monitoring function for monitoring network traffic. For example, exposing the first system to the first system input (i.e., in step 504 of process 500) comprises generating simulated network traffic and exposing the network traffic monitoring function to the simulated network traffic.

In one embodiment, step 502 comprises: (1) exposing a trusted network traffic monitoring function to the simulated network traffic; and (2) collecting data output by the trusted network traffic monitoring function as a result of the trusted network traffic monitoring function being exposed to the simulated network traffic.

In one embodiment, the first similarity measure determined in step 506 is equal to norm(SO1,SO2), wherein norm(SO1,SO2) is a function that produces a value indicating a similarity between SO1 and SO2. SO1 is the system output information generated by the trusted system, and SO2 is the system output information generated by the first system.

In one embodiment, norm( ) is a function that produces a root mean square error based on SO1 and SO2. In another embodiment, norm( ) is a function that produces a mean-absolute-error (MAE).

In one embodiment, the baseline system output information generated in step 502 comprises a first output value vector, which comprises a first output value corresponding to a first input value. The first system output information generated by the first system in step 504 comprises a second output value vector, which comprises a second output value corresponding to the first input value. Determining a first similarity measure in step 506 comprises determining a mathematical difference between the first output value and the second output value.

In one embodiment, the baseline system output information in step 502 comprises a first set of output values. The first system output information in step 504 generated by the first system comprises a second set of output values, wherein each output value included in the second set of output values corresponds to an output value included in the first set of output values. Determining the first similarity measure in step 506 comprises, for each output value included in the second set of output values: (1) determining a mathematical difference between the output value included in the second set of output values and its corresponding output value in the first set of output values and (2) squaring the mathematical difference.

In one embodiment of step 502, the first system input is selected from a plurality of input features. Each feature of the plurality of input features includes a corresponding probability value. Features of the plurality of input features having a corresponding probability value below a threshold probability value are selected as the first system input.

In one embodiment of process 500, the check is performed before a network of systems enters a critical mode. Therefore, process 500 identifies 'dormant' impostors that have entered the system.

In one embodiment of process 500, the process is performed to assess base station sleeping cells for impostors.

Example

Figure 8:
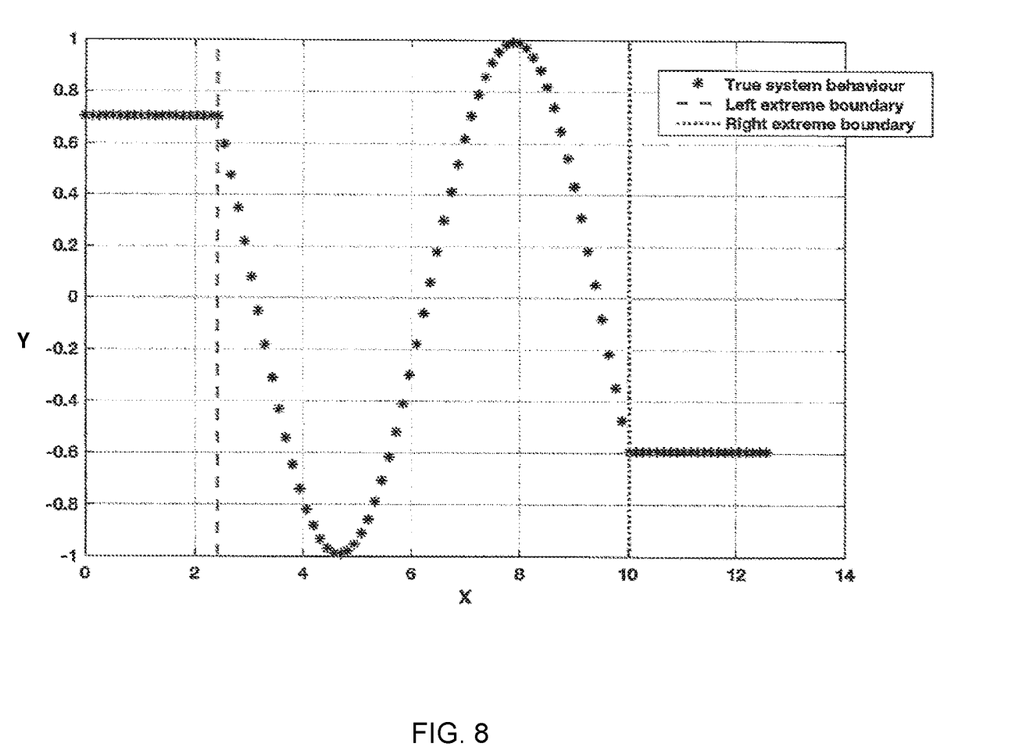
FIG. 8 illustrates the behavior of an example true system.
Figure 9:
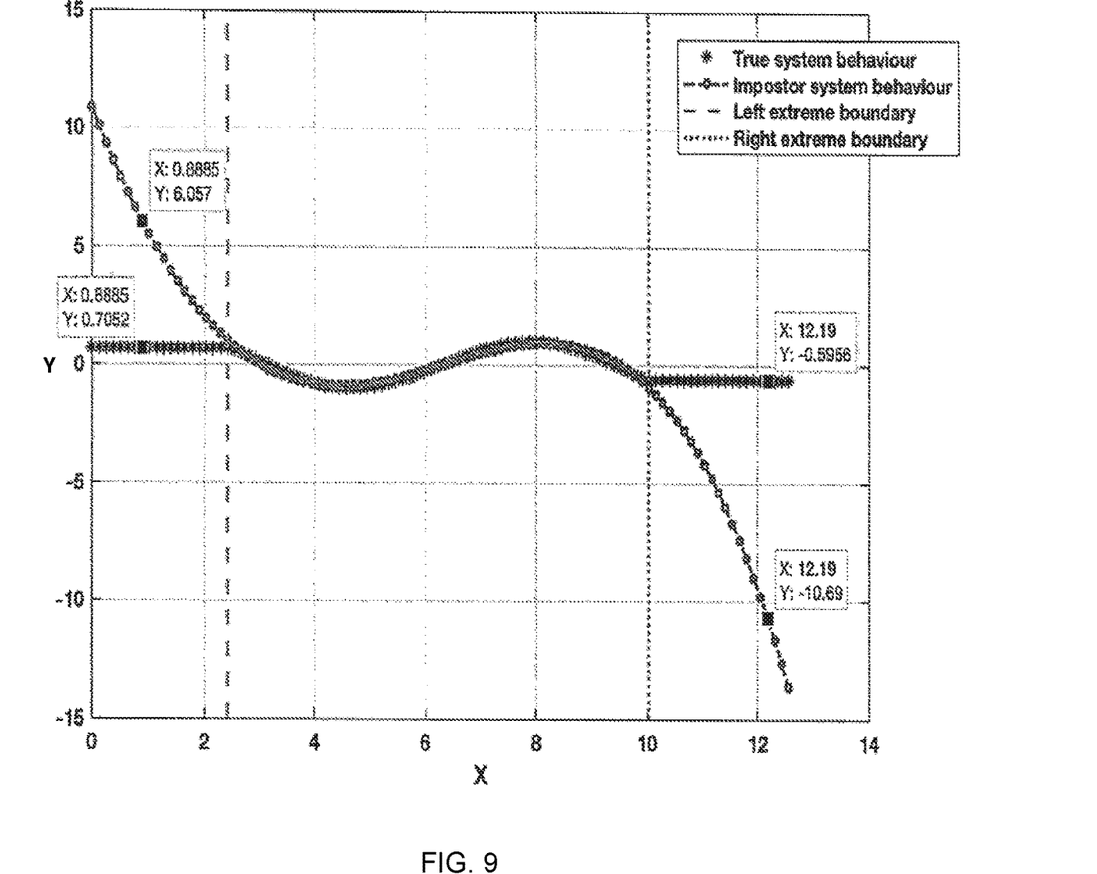
FIG. 9 illustrates the behavior of an example true system and the behavior of an imposter system.

Consider that the X-Y behavior of the true system is as shown in FIG. 8. (Several systems have saturation nonlinearities outside certain bounds). Consider also that the region between the left and right boundaries (i.e., the region denoted X") is visible to an observer, and that an impostor system has been constructed from the data observed by the observer. An example behavior of such an impostor system is illustrated in FIG. 9, and the behavior of the true system is also shown in FIG. 9. The behavior of the imposter system was constructed by fitting a polynomial of degree 4 on the data between the left and right boundaries (i.e., X"). As illustrated in FIG. 9, the impostor behavior is a very good representation of the true system in the X" region (i.e., nearly indistinguishable). However, in the X' and X' regions, there is a large difference in the behavior between the imposter system and the true system. Assume that the threshold to flag a system as an imposter is a 10% relative error from the true system behavior. In the X' region the relative error % at x=0.8885 is: (0.7052−6.057)/ 0.7052*100=−758.9% (a very large error). Similarly, in the X''' region the relative error % at x=12.19 is (−0.5956−12.19)/−0.5956=2146.7%. Clearly these two errors are well above the 10% threshold, and thus the system can be flagged as an impostor.

Figure 6:
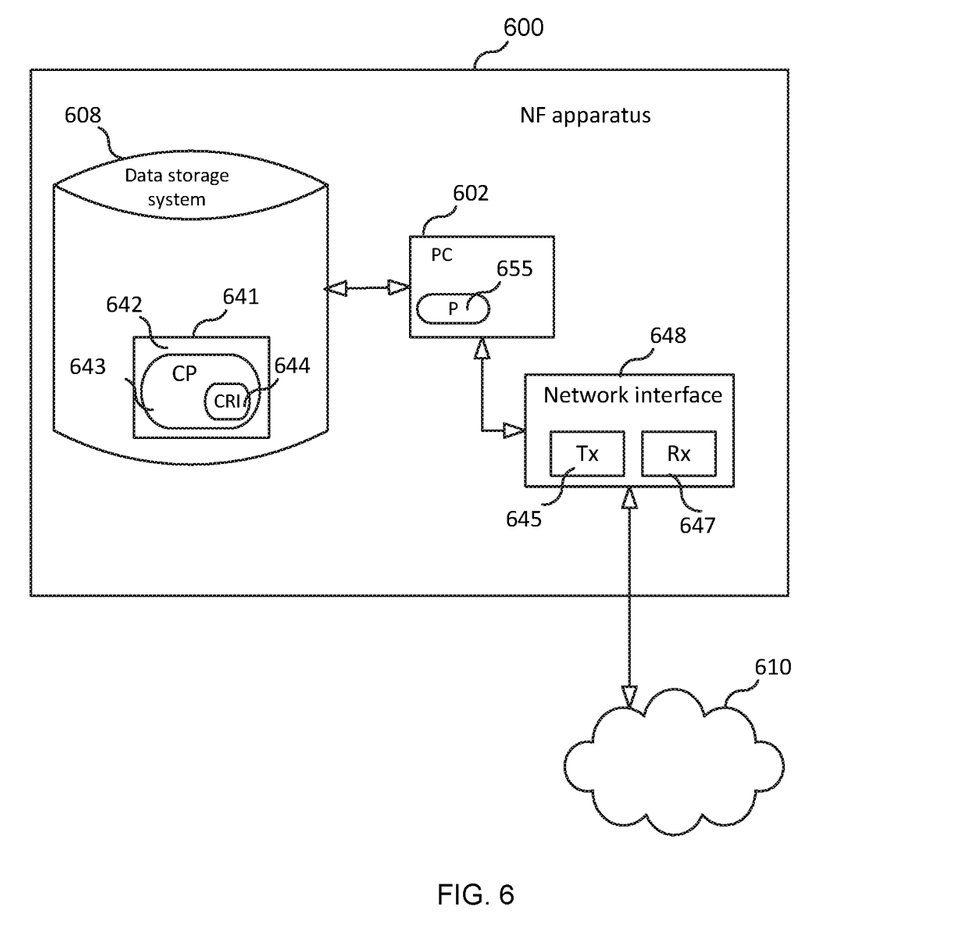
FIG. 6 is a block diagram of an apparatus, according to an embodiment.

FIG. 6 is a block diagram of a physical machine (or "apparatus") 600, according to some embodiments, which can be used to perform at least process 500. Apparatus 600 comprises: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 600 may be a distributed computing apparatus); a network interface 648 comprising a transmitter (Tx) 645 and a receiver (Rx) 647 for enabling apparatus 600 to transmit data to and receive data from other machines connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 600 to perform steps described herein (e.g., steps described herein with reference to the flow charts). In other embodiments, apparatus 600 may be configured to perform steps described herein without the need for code. That is, for example, PC 602 may consist merely of one or more ASICs. Hence, the features of the embodiments described herein may be implemented in hardware and/or software.

Figure 7:
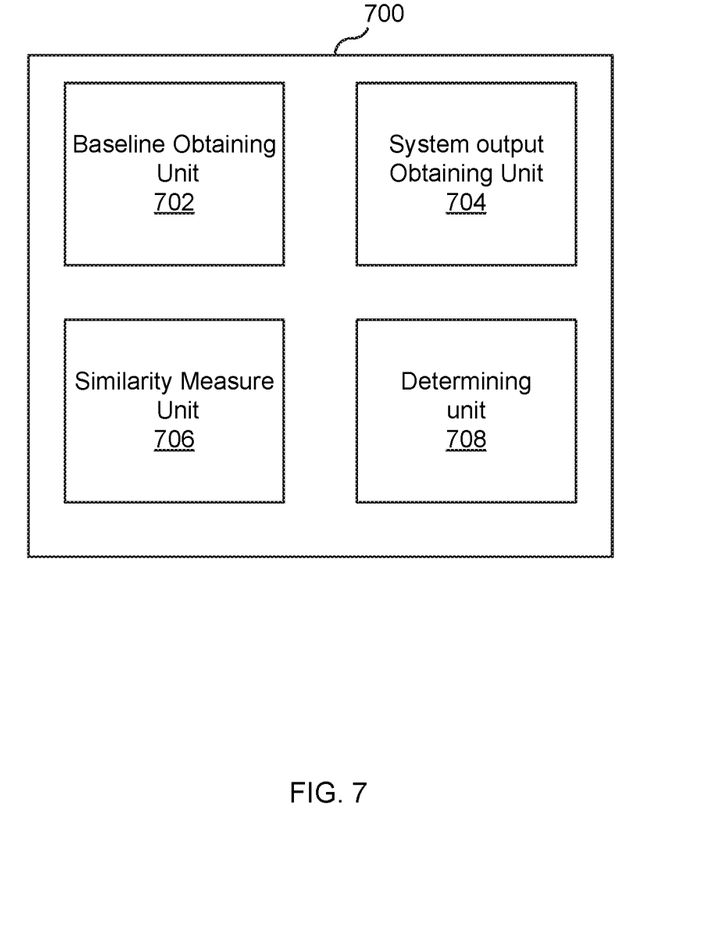
FIG. 7 is a block diagram of an apparatus, according to an embodiment.

FIG. 7 is a block diagram of an apparatus 700, according to an embodiment. Apparatus 700 includes a baseline obtaining unit 702; a system output obtaining unit 704; a similarity measure unit 706; and a determining unit 708. For example, units 702, 704, 706, and 708 perform steps 502, 504, 506, and 508, respectively, of process 500 of FIG. 5.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. The indefinite article "a" should be interpreted openly as meaning "at least one" unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is inherent that a step must follow or precede another step.

REFERENCES

[1] Baidu can clone your voice after hearing just a minute of audio (available at www.newscientist.com/article/2162177-baidu-can-clone-your-voice-after-hearing-just-a-minute-of-audio/);
[2] Facebook's AI can convert one singer's voice into another (available at https://venturebeat.com/2019/04/16/facebooks-ai-can-convert-one-singers-voice-into-an-other/);
[3] Google's AI can now translate your speech while keeping your voice (available at www.technologyreview.com/s/613559/google-ai-language-translation/); and
[4] Afchar, Darius, Vincent Nozick, Junichi Yamagishi, and Isao Echizen. "Mesonet: a compact facial video forgery detection network." In 2018 IEEE International Workshop on Information Forensics and Security (WIFS), pp. 1-7. IEEE, 2018.

The invention claimed is:

1. A method for detecting whether a first system should be declared as an impostor, the method comprising:
  obtaining baseline system output information that was generated based on first system input, wherein the first system input comprises a plurality of input features;
  obtaining first system output information generated by the first system based on the first system's exposure to the first system input, wherein
    obtaining the first system output information comprises exposing the first system to the first system input and then collecting data from the first system,
    the first system is a network traffic monitoring function for monitoring network traffic, and
    exposing the first system to the first system input comprises generating simulated network traffic and exposing the network traffic monitoring function to the simulated network traffic;
  determining a first similarity measure that indicates a similarity between the baseline system output information and the first system output information generated by the first system; and
  using the first similarity measure, determining whether or not to declare the first system as an impostor.

2. The method of claim 1, wherein obtaining the baseline system output information comprises:
  exposing a second system to the first system input, wherein the second system is a trusted system; and
  obtaining second system output information generated by the second system based on the second system's exposure to the first system input, wherein the second system output information comprises the baseline system output information.

3. A method for detecting whether a first system should be declared as an impostor, the method comprising:
  obtaining baseline system output information that was generated based on first system input;
  obtaining first system output information generated by the first system based on the first system's exposure to the first system input;
  determining a first similarity measure that indicates a similarity between the baseline system output information and the first system output information generated by the first system; and
  using the first similarity measure, determining whether or not to declare the first system as an impostor, wherein obtaining the baseline system output information comprises:
  exposing the first system to the first system input at a time when the first system was trusted; and
  obtaining second system output information generated by the first system based on the trusted system's exposure to the first system input at a time when the first system was trusted, wherein the second system output information comprises the baseline system output information.

4. The method of claim 1, wherein obtaining the baseline system output information comprises:
  exposing a trusted network traffic monitoring function to the simulated network traffic; and
  collecting data output by the trusted network traffic monitoring function as a result of the trusted network traffic monitoring function being exposed to the simulated network traffic.

5. The method of claim 1, wherein the first similarity measure is equal to norm(SO1,SO2), wherein norm(SO1, SO2) is a function that produces a value indicating a similarity between SO1 and SO2, SO1 is the system output information generated by a trusted system and SO2 is the system output information generated by the first system.

6. The method of claim 5, wherein
  norm( ) is a function that produces a root mean square error based on SO1 and SO2, or
  norm( ) is a function that produces a mean-absolute-error based on SO1 and SO2.

7. The method of claim 1, wherein
  the baseline system output information comprises a first output value vector comprising a first output value corresponding to a first input value,
  the first system output information generated by the first system comprises a second output value vector comprising a second output value corresponding to the first input value, and
  determining a first similarity measure comprises determining a mathematical difference between the first output value and the second output value.

8. The method of claim 1, wherein
  the baseline system output information comprises a first set of output values,
  the first system output information generated by the first system comprises a second set of output values, wherein each output value included in the second set of output values corresponds to an output value included in the first set of output values, and
  determining the first similarity measure comprises, for each output value included in the second set of output values: determining a mathematical difference between the output value included in the second set of output values and its corresponding output value in the first set of output values and then squaring the mathematical difference.

9. The method of claim 1, wherein
  each feature of the plurality of input features corresponding to a probability value, wherein features of the plurality of input features having a corresponding probability value below a threshold probability value are selected as the first system input.

10. A non-transitory computer readable storage medium storing a computer program comprising instructions which when executed by processing circuitry of an apparatus causes the apparatus to perform the method of claim 1.

11. An apparatus for detecting whether a first system should be declared as an impostor, the apparatus comprising:

processing circuitry; and memory storing a computer program for configuring the apparatus to:

obtain baseline system output information that was generated based on first system input, wherein the first system input comprises a plurality of input features;

obtain first system output information generated by the first system based on the first system's exposure to the first system input, wherein to obtain the first system output information comprises to expose the first system to the first system input and then to collect data from the first system, the first system is a network traffic monitoring function for monitoring network traffic, and to expose the first system to the first system input comprises to generate simulated network traffic and to expose the network traffic monitoring function to the simulated network traffic;

determine a first similarity measure that indicates a similarity between the baseline system output information and the first system output information generated by the first system; and use the first similarity measure in a process for determining whether or not to declare the first system as an impostor.

12. The apparatus of claim 11, wherein obtaining the baseline system output information comprises:

exposing a second system to the first system input, wherein the second system is a trusted system; and obtaining second system output information generated by the second system based on the second system's exposure to the first system input, wherein the second system output information comprises the baseline system output information.

13. The apparatus of claim 11, wherein obtaining the baseline system output information comprises:

exposing the first system to the first system input at a time when the first system was trusted; and obtaining second system output information generated by the first system based on the trusted system's exposure to the first system input at a time when the first system was trusted, wherein the second system output information comprises the baseline system output information.

* * * * *